United States Patent [19]
Schwartz et al.

[11] 3,934,667
[45] Jan. 27, 1976

[54] ARTICULATED VEHICLE COUPLER

[75] Inventors: Daniel M. Schwartz, Los Altos; John W. Cross, San Jose, both of Calif.

[73] Assignee: Lockheed Missiles & Space Company, Inc., Sunnyvale, Calif.

[22] Filed: July 1, 1974

[21] Appl. No.: 484,873

[52] U.S. Cl. ............................. 180/14 A; 180/14 B
[51] Int. Cl.² .......................................... B62D 59/00
[58] Field of Search ........ 180/14 B, 14 A, 14 R, 11, 180/12, 51; 280/479 R, 481, 492; 172/797

[56] References Cited
UNITED STATES PATENTS

| | | | |
|---|---|---|---|
| 1,911,507 | 5/1933 | Hitchcock | 180/14 R X |
| 1,965,985 | 7/1934 | Morgan | 180/14 R |
| 2,390,908 | 12/1945 | Young | 180/14 R X |
| 3,244,249 | 4/1966 | Thomas | 180/14 R |
| 3,336,996 | 8/1967 | Hautzenroeder | 180/14 R |
| 3,604,526 | 7/1969 | Hutchinson | 180/51 |
| 3,822,756 | 7/1974 | Martin | 180/14 R |
| 3,831,693 | 8/1974 | King | 180/14 A |
| 3,847,415 | 11/1974 | Geisthoff | 180/14 R X |

Primary Examiner—Robert R. Song
Assistant Examiner—Terrance L. Siemens
Attorney, Agent, or Firm—H. Donald Volk; Billy G. Corber

[57] ABSTRACT

This invention relates to a steerable articulation coupler for effecting rapid connection of the two sections of a ground vehicle. The coupler also provides for rapid automatic connection of the power transmission shaft. The coupler consists of a socket member and an insertion member. The insertion member includes a forward semi-spherical support surface, a rearward large diameter support surface, a guide receptacle and a set of alignment members. Counterparts on the socket member cooperate with the insertion member to align the two members.

11 Claims, 5 Drawing Figures

ARTICULATED VEHICLE COUPLER

BACKGROUND OF THE INVENTION

This invention relates to a coupler for connecting two sections of a ground vehicle which may have relative articulation and more particularly to such a coupler that also provides for the rapid connection of the power transmission shaft. The coupler of this invention is particularly suitable for ground vehicles that include a first or power and control section that can be connected to a load carrying or ground working section. A ground vehicle on which this coupler can be used is shown in co-pending U.S. patent application Ser. No. 318,540, filed Dec. 26, 1972, now U.S. Pat. No. 3,831,693 issued Aug. 27, 1974, entitled "Steerable Articulation Joint". This co-pending application is assigned to the same assignee. The first or power and control section normally includes, in addition to a prime mover, an operator's station and electrical and hydraulic control systems for controlling the vehicle and may include means for transmitting power to the second section. The second or load carrying or ground working section can take any desired form, such as a container for hauling material, a loader, a dozer, a scraper, a grader, etc. Because the first or power and control section includes a greater number of complex moving parts then the second member, the first section is more expensive to build and to maintain. Also, a common standardized power section which mates with a variety of work sections results in simplified maintenance, repair and training of personnel as well as reducing the required investment in vehicles. Accordingly, a readily engagable and disengagable coupler is provided by the present invention which enables two or more different load carrying or ground working sections to be interchangeable with a given power and control section. This readily attachable and detachable coupler also expedites disconnection of the power and control section as may be needed to expedite maintenance and repair.

Because the apparatus for coupling the two sections may afford articulation between the two sections, the wheels of both sections maintain power driving contact with the ground at all times. This allows the articulated vehicle to maneuver and maintain traction on extremely rugged and irregular terrain and particularly in soft soils. Relative movement between the two sections is afforded along a roll axis (a horizontal axis extending longitudinally of the vehicle) and a yaw axis (a vertical axis through the midpoint of the vehicle) but not in the pitch axis (a horizontal axis extending transversely of the vehicle). The articulation feature may be omitted or locked out for some vehicles where it is not required for vehicle function. The present invention achieves the above advantages of all wheel drive ground vehicles in a straightforward manner and permits the two sections to be quickly attached to one another.

The present invention provides a readily engagable or disengagable coupler and drive shaft for joining the two sections. This is achieved by providing a socket affixed to one of the sections and an entering member affixed to the other section that telescopically enters and is received and retained within the socket by uncomplicated mechanisms. Where articulation between the section is required, the connection between the entering member and the section to which it is attached is adapted to allow the requisite movement with respect to the roll axis and the yaw axis, and may also allow the transmission of drive power across the coupler.

The present invention also provides a joint between the two sections that can be rapidly engaged and disengaged on rough or irregular terrain rapidly by one operator. This is achieved by providing a coupler that is automatically aligned over a range of elevations and angles. For aligning the two members, a socket member with a relatively large mouth is adapted to receive the entering member. Inward at the mouth, the socket tapers to a relatively small cross sectional shape. The entry member is tapered correspondingly with a non-uniform taper which includes an aligning guide. Thus, precise initial positioning of the two parts of the joint is unnecessary because the two parts telescopically align automatically as the two sections are moved toward one another. The guide on the socket member, in cooperation with the taper of the entry member, allows the two parts to telescope into alignment automatically as the two sections are moved towards one another so that when the entry member is fully received in the socket, the two parts are precisely aligned and ready for final encouplement.

The insertion member includes a first cylindrical surface and a second cylindrical mating surface whose axis is parallel with the axis of said first surface. A tapered guideway is intermediate the first and second cylindrical surfaces. The socket member of the joint has corresponding first and second internal cylindrical surfaces. The socket member also includes an aligning guide which cooperates with the tapered guideway of the insertion member to automatically complete the alignment of insertion member into the socket.

A system of radial keys provides for final alignment of the coupler members and provides torsional load-carrying ability. A breechblock lock connected to the radial keys provides positive locking of the coupler members. This lock allows a single operator to rapidly and positively lock the coupler members together.

A power connection between the two sections is usually required so that all ground contact members can be powered. This is achieved in one form of the present invention by providing, as a part of the coupler, a drive shaft between the two sections of the coupler. This drive shaft is coupled by universal joints so as to avoid interference with articulation movement, and is coupled automatically when the coupler is fully engaged.

The foregoing, together with other objects, features and advantages of the present invention would be more apparent after referring to the following specification and accompanying drawings in which.

Figure 1:
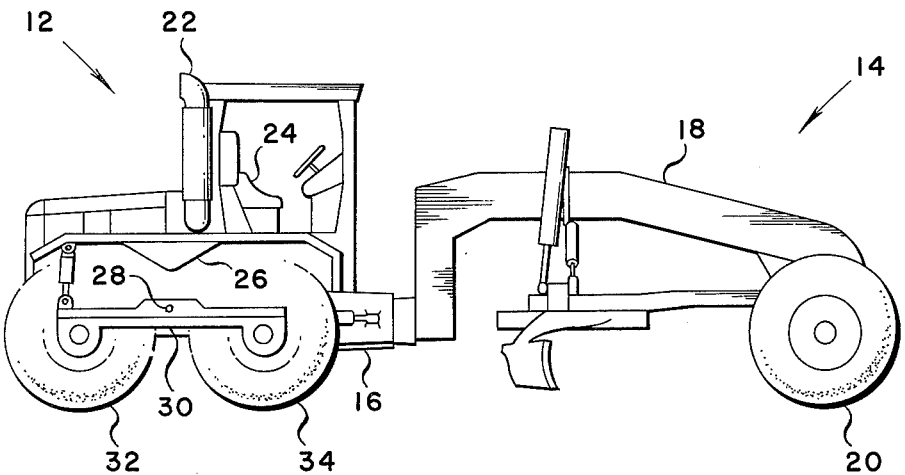
FIG. 1 is a partially schematic side elevation view of a vehicle employing the coupler of the present invention.

Referring more particularly to the drawings, reference numeral 12 indicates the first or power and control section of a ground vehicle and 14 indicates a second or load carrying or ground working section which is joined to section 12 by an articulating coupler 16. Vehicle section 14, in the example shown in FIG. 1, comprises a grader for grading dirt, rock or the like. Vehicle section 14 includes a frame 18. A pair of ground contacting members, such as wheel 20 are attached to frame 18 by a conventional vehicle suspension system. Through suitable drive trains, not shown, power is supplied to wheel 32 and wheel 34 and their counterpart on the opposite side of the vehicle, and such power train is also connected to the second section 14, through coupler 16. The first or power control section of the vehicle includes a prime mover such as a gasoline, diesel or turbine engine of conventional form which is supplied with conventional air intake and which exhaust combustion products through an exhaust system 22. The first section also includes an operator station 24 which is provided with appropriate steering and power controls. The suspension system for the first section includes a walking beam 30 at the forward end of which is mounted a wheel 32 and the rear end of which is mounted a wheel 34. Wheels 32 and 34 have their counterparts on the opposite side of the vehicle. The walking beam suspension system permits both wheels 32 and 34 to remain in ground contact at all times through suitable drive train which includes suspension system shaft 28. Suspension system shaft 28 is connected to the first section 12 through the longitudinal frame structure 26. Wheel 32 along with its counterpart on the opposite side of the vehicle are steerable.

Figure 4:
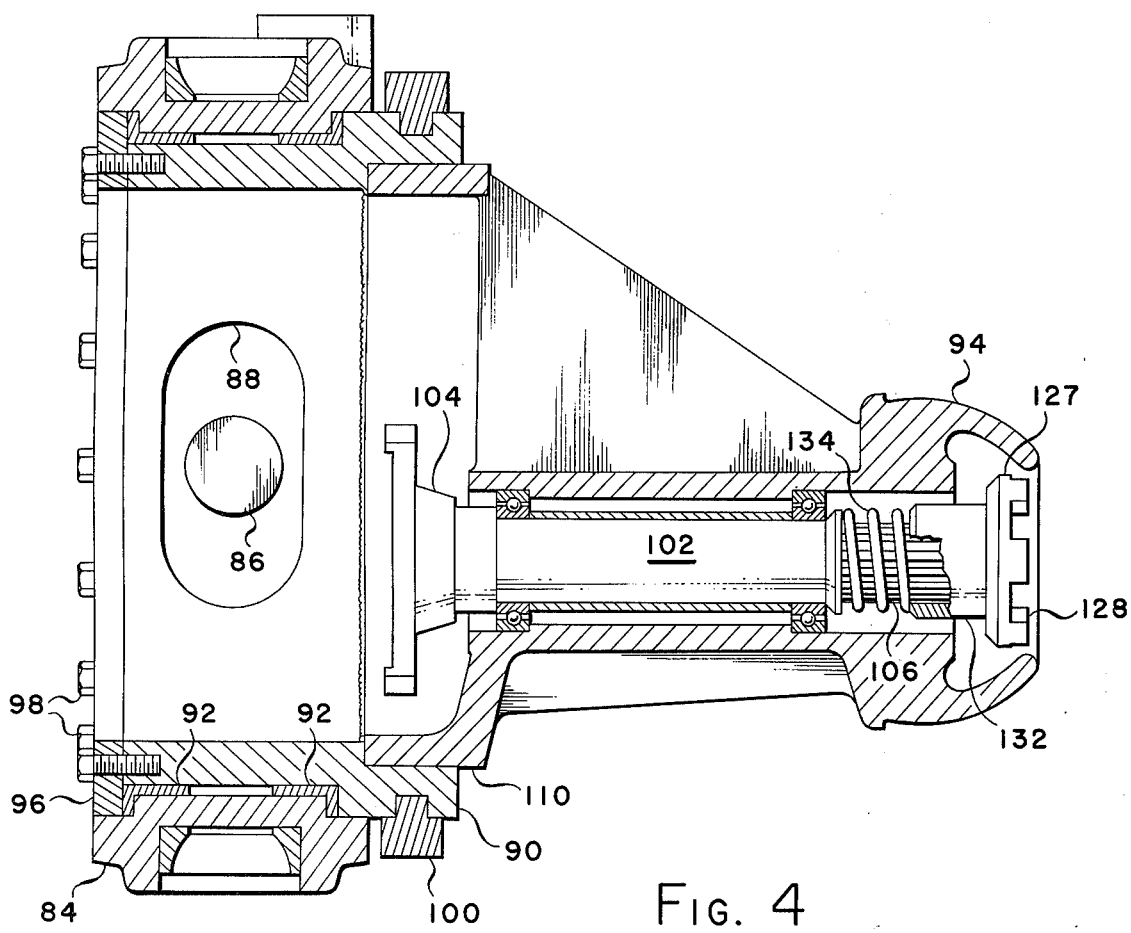
FIG. 4 is a side elevation view of the insertion member of FIG. 2, portions being broken away to reveal internal details.
Figure 2:
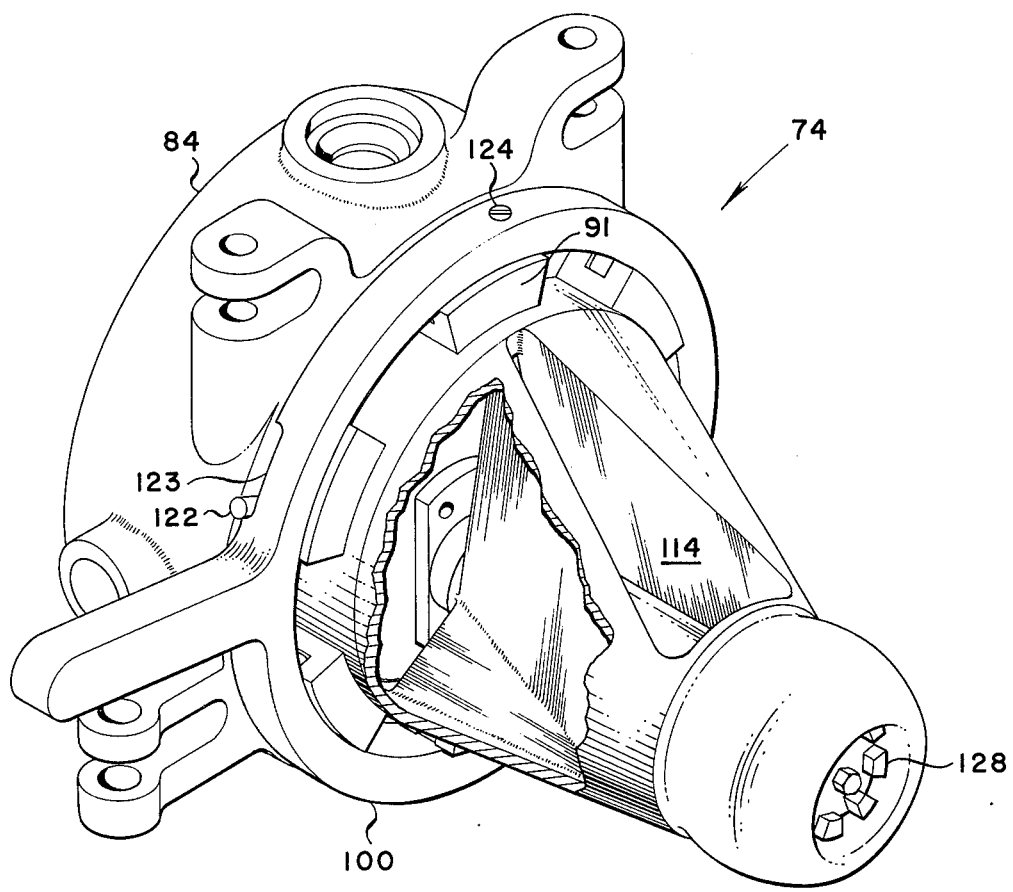
FIG. 2 is a perspective view of one embodiment of the insertion member of the coupler according to the present invention.
Figure 3:
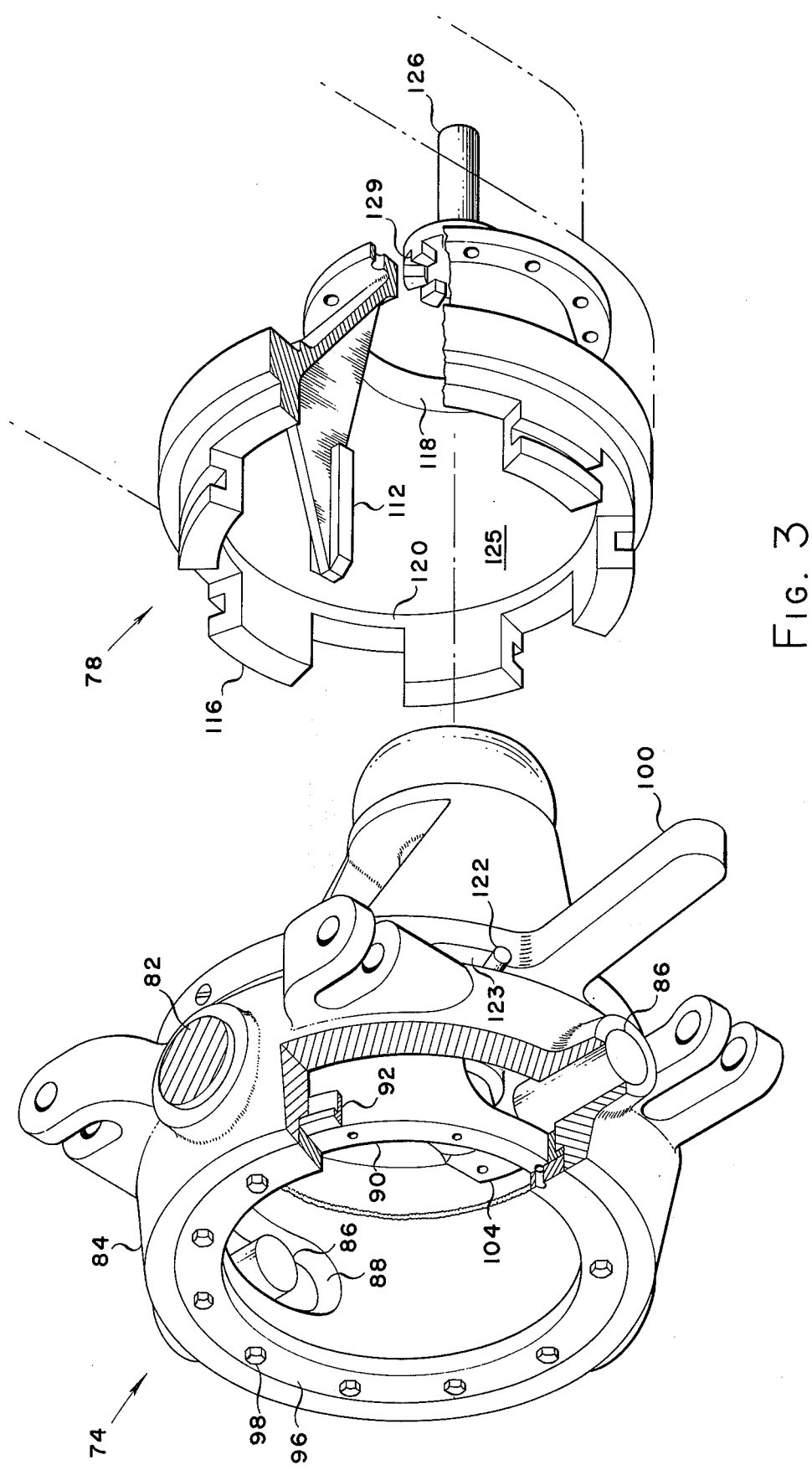
FIG. 3 is a perspective view of a coupler according to the present invention in the disengaged position, portions being broken away to reveal internal details.

With reference to FIG. 2, 3 and 4, the outer housing 84 of the insertion member 74 is pivotably attached to the first or power control section 12 by yaw pin 82. A roll limit pin 86 is rigidly attached to the outer housing 84 and projects inwardly therefrom. Inner housing 90 is rollably mounted by roll bushing 92 on the interior of outer housing 84. Roll limit pin 86 projects into elongated guide 88 defined by the inner housing 90. Thrust ring 96 is attached to the other end of inner housing 90 by an annular ring of bolts 98. Lockring 100, which includes a plurality of circumferential keys, is rotatably mounted on the outer periphery of inner housing 90. The plurality of circumferential keys on lockring 100 mesh with the slots in radial keys 91 on inner housing 90. A lockring stop 122 projects from inner housing 90 and cooperates with lockring stop guide 123 machined in lockring 100 to limit the travel of the lockring 100. Detent lock 124 cooperates with two detents in inner housing 90 to assist holding the locking ring 100 in either the locked or open position. The specific details of the detent lock 124 are conventional and are not shown. A shaft drive line 102 which includes a yoke drive line 104 is mounted in inner housing 90. Shaft drive line 102 includes a male spline 106 splined to clutch 127. Clutch 127 includes interlocking teeth 128. A first exterior semi-spherical support surface 94 is machined or otherwise formed on the outer or distal extremity of insertion member 74. External semi-spherical support surface 94 is concentric with drive shaft 102. The second external cylindrical support surface 110 is formed on the proximal outer periphery of insertion member 74 adjacent to inner housing 90. The second external cylindrical support surface 110 is machined or otherwise made parallel to and eccentric with the first external semi-spherical support surface 94. A snout shaped surface is mesial the support surface 110 and the semi-spherical support surface 94.

Socket member 78 of articulated coupler 16 is rigidly affixed to the load carrying or ground working section 14 of the ground vehicle. Projecting within socket member 78 is T shaped guide 112 which cooperates with guide receptacle 114 for aligning the insertion member 74 and the socket member 78. Lockring flanges or radial keys 116 are machined on the outer extremity of socket member 78. Radial keys 116 mesh with similar radial keys 91 on inner housing 90 of socket member 28. Radial keys 116 include a radial slot that cooperates with the circumferential keys on lockring 100 when the socket member 78 and the insertion member 74 are fully engaged and lockring 100 is turned to the locked position. Radial keys 116 and radial keys 91 also function as a first and second set, respectively, of final alignment members for fine alignment of socket member 78 and insertion member 74. Internal of socket member 78 are first internal cylindrical support surface 118 and second internal cylindrical support surface 120 that correspond to and cooperate with the first external semi-spherical support surface 94 and the second external cylindrical support surface 110 on insertion member 74. Although support surface 94 is described as semi-spherical, it could be cylindrical or conical, if desired.

To explain the operation of the present invention, it will be power and control section 12 and the load carrying or ground working section 14 are disconnected from one another and lockring 100 is set in the unlocked position so as to not interfere with the coupling. In this disengaged position the mouth 125 of socket number 78 presents a broad, unobstructed opening for receipt of the relatively narrow end of insertion member 74. Power and control section 12 is then backed slowly towards the load carrying or ground working section 14. Misalignment in the vertical direction is compensated for by the guide receptacle 114 of insertion member 74. As backing movement of the power and control section 12 proceeds, T shaped guide 112 of socket member 78 eventually contacts one or the other side faces of guide receptical 114. Because of the tapered configuration of the walls of guide receptical 114, contact and further rearward movement of the insertion 74 brings the insertion member into approximate alignment with socket member 78. As the mating nears completion the first external semispherical support surface 94 and the compliment first internal cylindrical support surface 118 on the walls of socket member 78 and the second external cylindrical support surface 110 and its complimental second internal cylindrical surface 120 in socket member 78 bring the insertion member into proper vertical alignment within socket member 78. At the same time, T shaped guide 112 rides within guide receptical 114 so that lockring ring flange 116 and radial keys 91 mesh. Thus, the guide and the guide receptacle afford a fine or precise final alignment between the members so that when the members are fully aligned, lockring 100 can be rotated, and the engagement of the joint is complete. Shaft drive line 102 is automatically connected to the drive shaft 126 in the second or load carrying or ground working section 14 through the interlocking teeth 128 and 129. If the interlocking teeth are not lined up when the coupler members are fully aligned, collar 132 will be pushed back on spline 106. As the shaft drive line 102 is turned further, the interlocking teeth 128 and 129 will eventually mesh, at which time spring 134 will force collar 132 toward drive shaft 126 in the second vehicle, thus forcing interlocking teeth 128 and 129 to lock together.

It would be appreciated that when the joint is connected as has been described in the proceeding paragraph, inner housing 90 semi spherical support surface 94 are rigidly mated to socket member 78 and this assembly, as a unit, is free to rotate in the roll direction (relative to the outer housing 84) within the limits described by elongated guide 88.

In order to disconnect the power and control section 12 from load carrying or ground working section 14 to use the former section with another working section, it is only necessary to rotate lockring 100 and then the power and control section 12 can be driven away under its own power.

Figure 5:
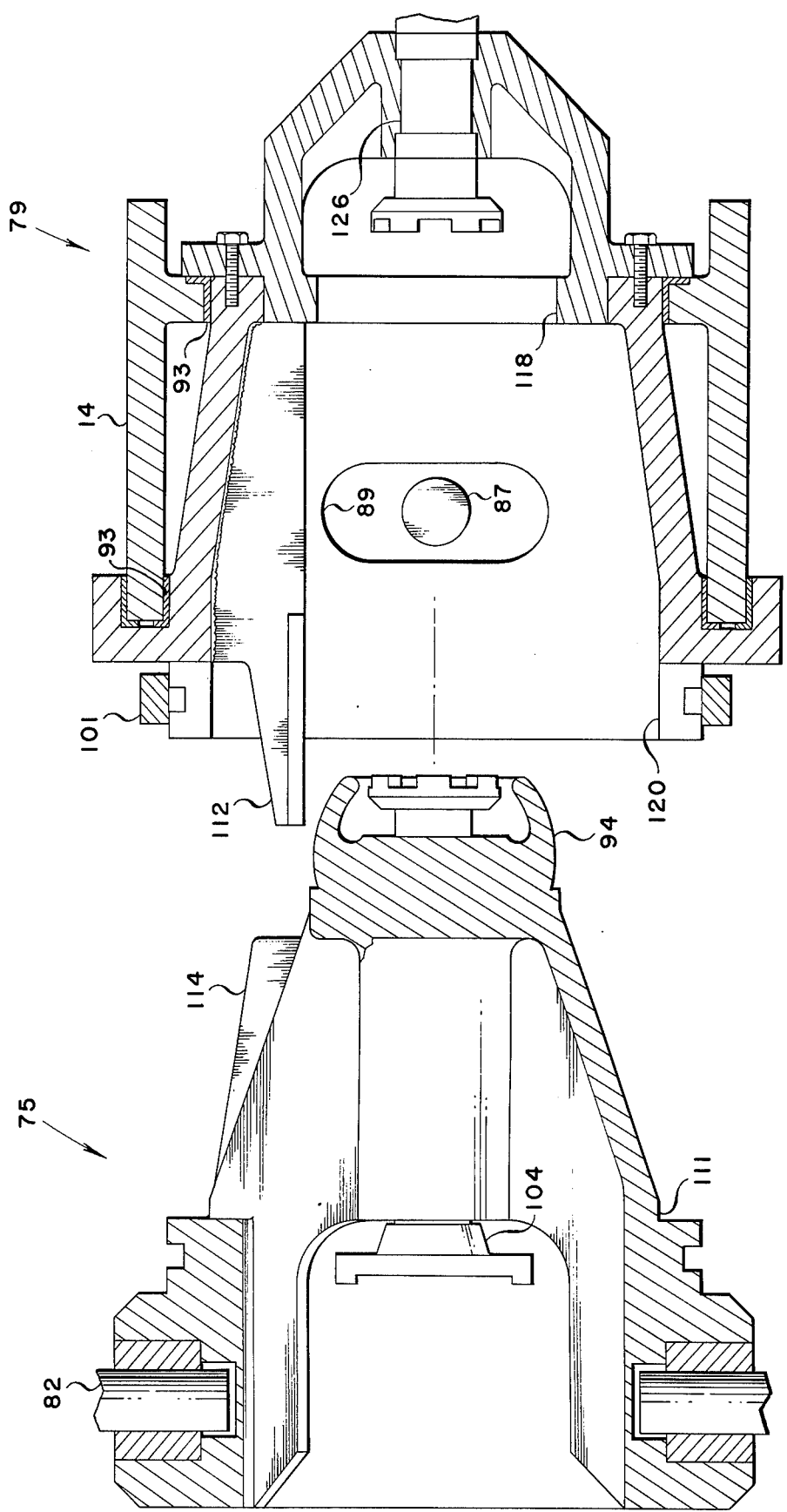
FIG. 5 is a cross-sectional side elevation of a second embodiment of the coupler according to the present invention.

In the second embodiment of the coupler shown in FIG. 5, the insertion member is mounted for pivital movement and the socket member is mounted for roll movement. Specifically, the insertion member 75 is pivotably attached to the first or control section 12 by yaw pin 82. A drive shaft (not shown) includes a yoke drive line 104 is mounted within insertion member 75. A first exterior semi-spherical support surface 94 is concentric with the drive shaft (not shown). A second external cylindrical support surface 111 is formed on the outer periphery of insertion member 75. The second external cylindrical support surface 111 is machined or otherwise made parallel to and concentric with the first external semi-spherical support surface 94.

Socket member 79 is rollably mounted by roll bushings 93 on the load carrying or ground working section 14. A roll limit pin 87 is rigidly load carrying or ground working section 14 and projects inwardly into elongated guide 89 in socket member 79. The roll limit pin 87 in cooperation with elongated guide 89 limit the roll of socket member 79.

A T shaped guide 112 cooperates with guide receptacle 114 for aligning the insertion member 75 and the socket member 79. Internal of socket member 79 are a first cylindrical support surface 118 that corresponds to and cooperates with the first exterior semi-spherical support surface 94 and a second internal cylindrical support surface 120 that cooperates with the second external cylindrical support surface 111 on insertion member 75. The lockring 101 cooperates with lockring flanges for final alignment and locking of the insertion member 75 and the socket member 79. Since this procedure is the same as the procedure for the first embodiment shown in FIGS. 2, 3 and 4, the details are not repeated here.

It is understood that the lockring 100 could be mounted on the insertion member 75 instead of the socket member 79 if desired.

From the above, it can readily be seen that the present invention provides a fast acting, simple and rugged apparatus for joining the sections of a ground vehicle and also provides alignment between the two vehicle sections.

While the articulated joint described herein is presently considered to be preferred, it is contemplated that numerous various other variations and modifications within the purview of those skilled in the art can be made therein. For example, roll rotation between the insertion member and the control section may be omitted where not required, or a supplemental roll lockout provided if desired. Also, the insertion member may be rigidly mounted on the control section rather than through the yaw pin. The following claims are intended to cover all such variations and modifications as fall within the true spirit and scope of the invention.

We claim:

1. Coupler apparatus for joining first and second sections of a ground vehicle comprising
    a socket forming member adopted to be attached to said first section,
    an insertion means adopted to be attached to said second section, said insertion means complementary with and receivable in said socket member,
    said insertion means including a forward semi-spherical support surface and a rearward larger diameter cylindrical support surface,
    a guide receptacle defined by a pair of tapered walls in said insertion means,
    a guide projecting from said socket forming member, said guide cooperating with the tapered walls of said guide receptacle to assist in angularly aligning said insertion means and said socket member,
    first set of final alignment members on the said socket member,
    second set of final alignment members on the said insertion means, said first and second set of alignment members meshing for providing final alignment of said insertion means and said socket member,
    locking means, said locking means cooperating with said first set of final alignment members and said second set of final alignment members for rigidly attaching said insertion means and said socket member.

2. Coupler apparatus according to claim 1 wherein said insertion means includes a pair of yaw pins adapted to mount said insertion means for yaw movement relative to said second vehicle section.

3. Coupler apparatus according to claim 1 including means for mounting said socket forming member for roll movement relative to the said first vehicle section.

4. Apparatus according to claim 1 where said first final alignment member comprises a plurality of first radial keys projecting from the proximal end of said insertion member, said second final alignment member comprising a plurality of second radial keys on the distal end of said socket member, and wherein said locking means comprises a breechblock lock of circumferential keys, said breechblock lock mounted for rotational movement on said insertion member so that the first and second plurality of radial keys can be meshed with said circumferential keys when the lock is in a first position and said breechblock lock unlocks the insertion member and socket member when the lock is in a second position.

5. Coupler apparatus according to claim 1 including means for mounting said insertion means for roll movement relative to said second vehicle section.

6. Apparatus according to claim 1 wherein said socket forming member is further defined as having a cylindrical flange defining a throat opening and the cylindrical mouth define a tapered throat.

7. Apparatus according to claim 6 wherein said cylindrical mouth is further defined as mounted eccentric to said throat opening.

8. Apparatus according to claim 7 wherein the distal end of said insertion member defines a spherical guideway corresponding to said throat opening of said socket forming member, the proximal end of said insertion member defined by a cylindrical support surface, a snout shaped surface mesial said spherical guideway and said cylindrical support surface.

9. Apparatus according to claim 8 including a guide receptacle defined by said snout shaped surface of said insertion member, said guide receptacle further defined as including a tapered flat bottom surface for cooperating with said guide on said socket member for fine alignment of the insertion member and the socket member.

10. The coupler apparatus according to claim 1 including a power transmission means rotatably mounted within said insertion means, a power receiving means rotatably mounted within said socket forming member automatically engagable with said power transmission means when said socket member and said insertion member are fully engaged.

11. Apparatus according to claim 10 where said power transmission means includes a vehicle driveshaft, said driveshaft including a yoke drive line on one end and a spline on the other end, a spring loaded clutch meshing with said spline, said spring loaded clutch allowing connection of said power transmission means to the power receiving means when the said insertion member and said entry members are fully engaged.

* * * * *